Figure 21:
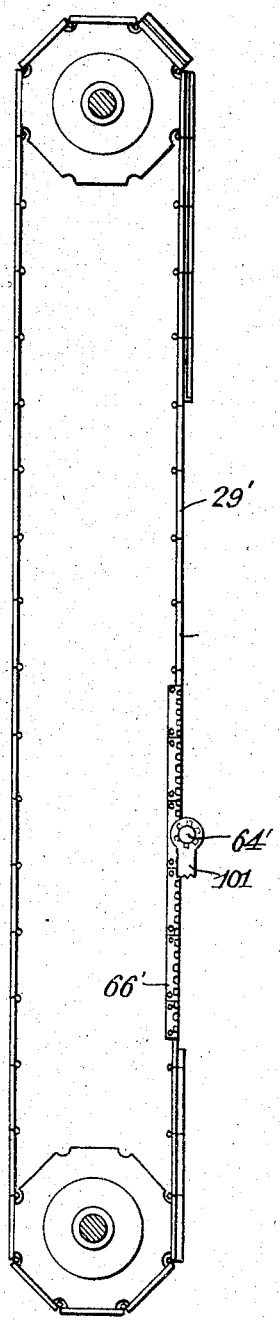

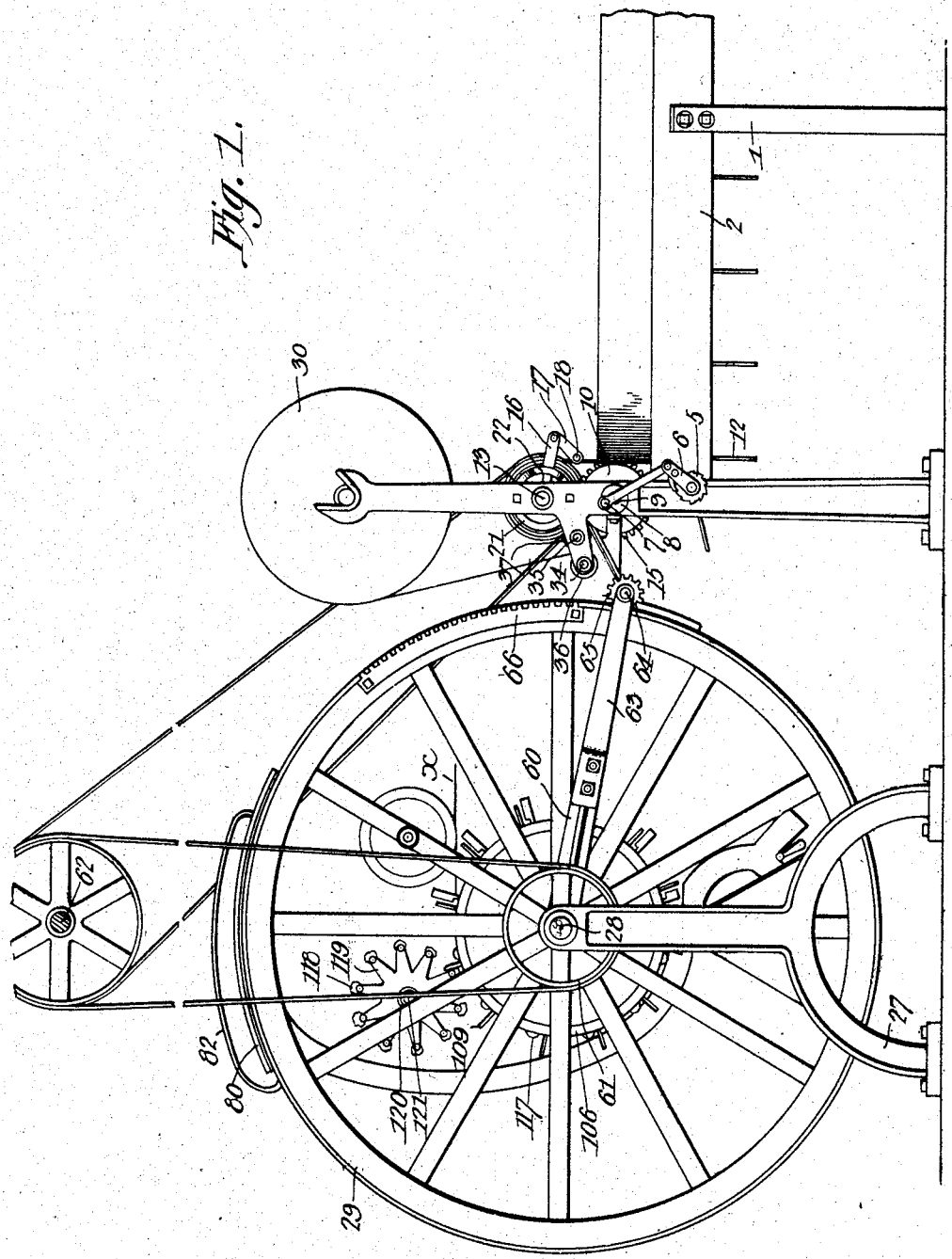

No. 781,123. PATENTED JAN. 31, 1905.
J. L. BOYLE.
NEWSPAPER WRAPPING MACHINE.
APPLICATION FILED AUG. 20, 1903.
10 SHEETS—SHEET 2.
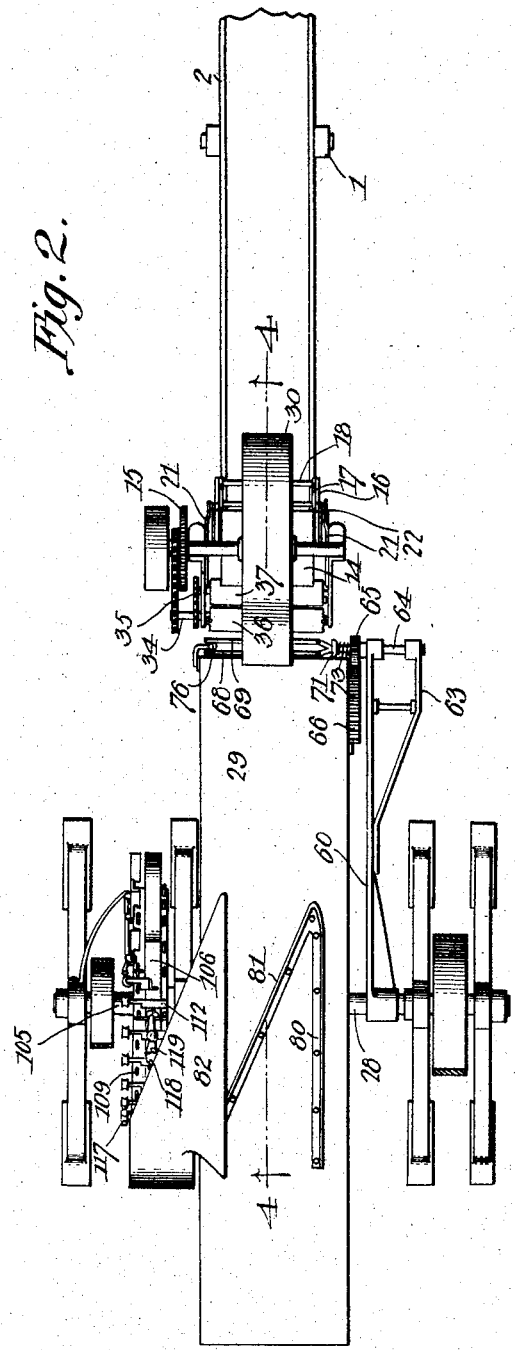
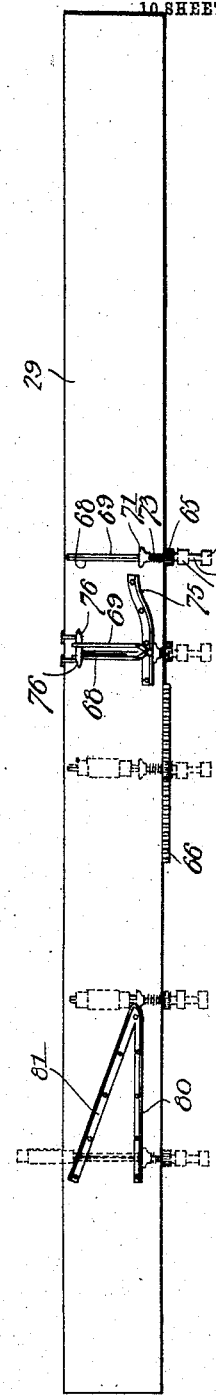
Witnesses
J. L. Boyle, Inventor.
by C. A. Snow & Co.
Attorneys

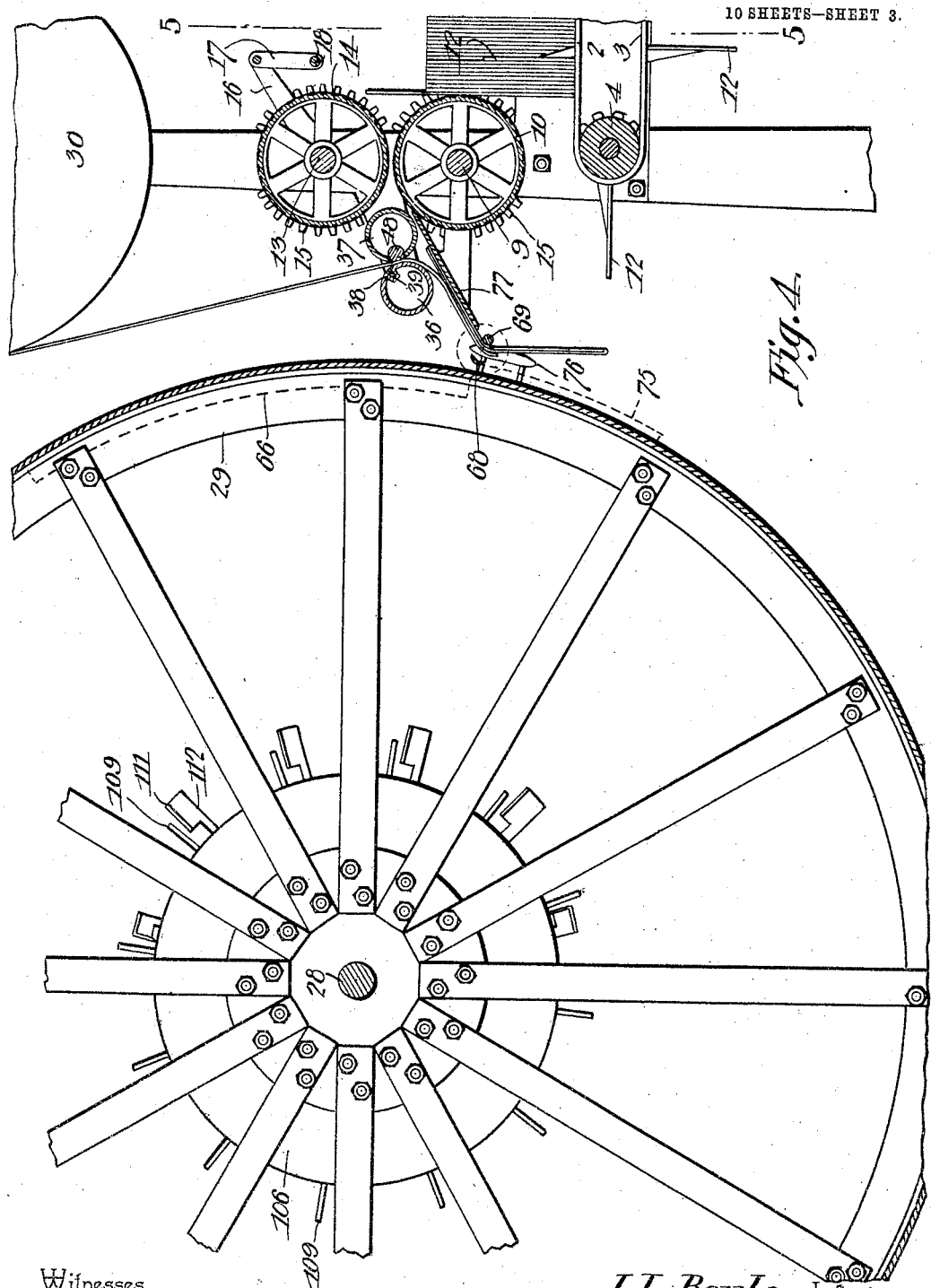

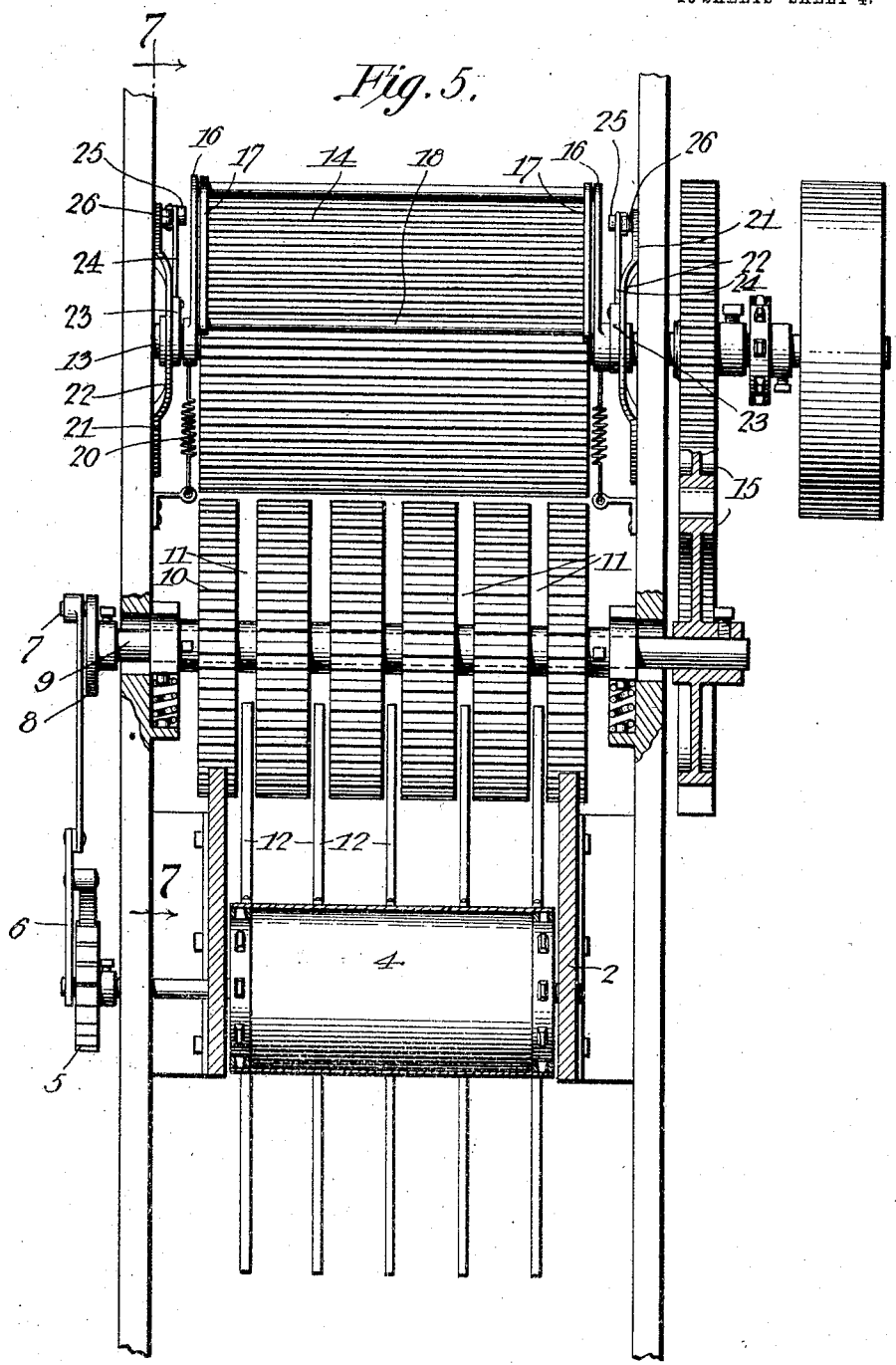

No. 781,123. PATENTED JAN. 31, 1905.
J. L. BOYLE.
NEWSPAPER WRAPPING MACHINE.
APPLICATION FILED AUG. 20, 1903.
10 SHEETS—SHEET 5.
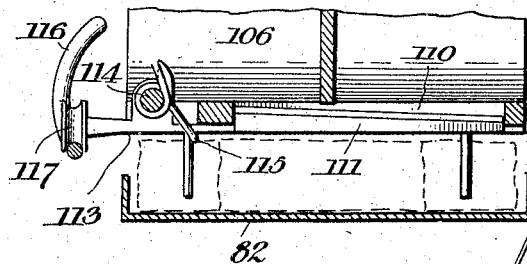
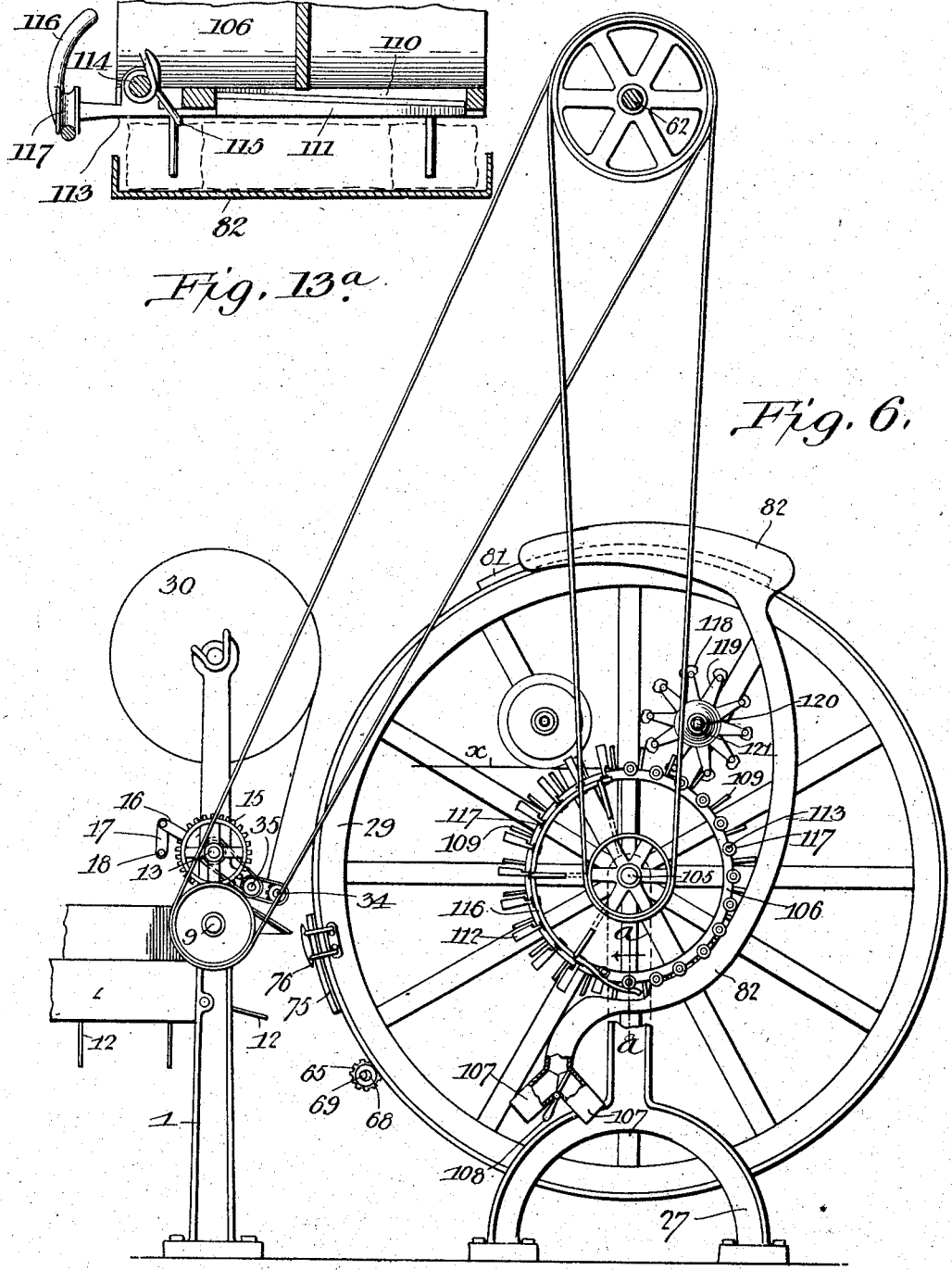
J. L. Boyle, Inventor.

No. 781,123. PATENTED JAN. 31, 1905.
J. L. BOYLE.
NEWSPAPER WRAPPING MACHINE.
APPLICATION FILED AUG. 20, 1903.
10 SHEETS—SHEET 6.
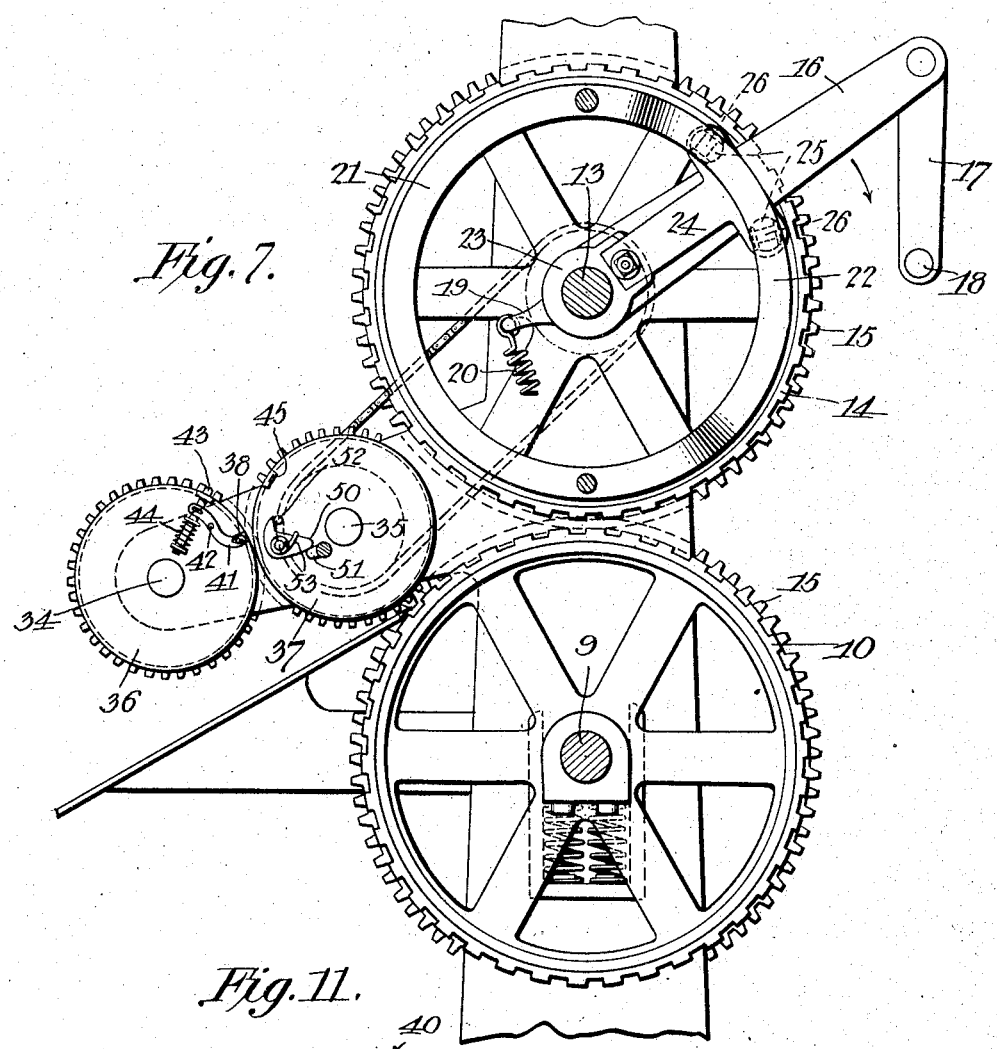
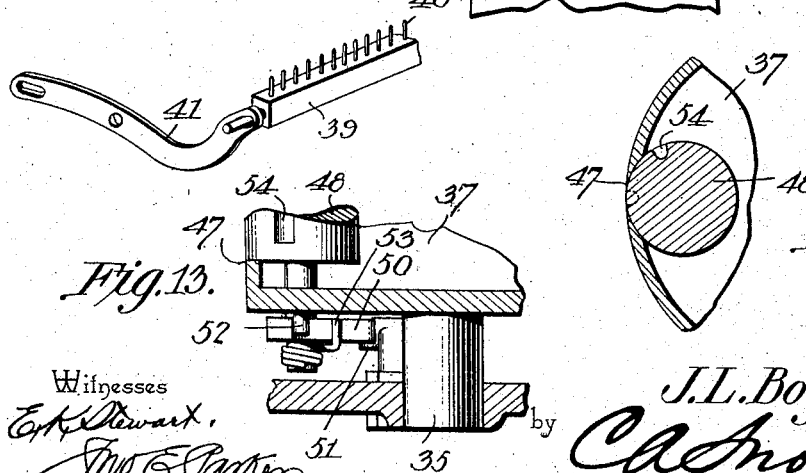
J. L. Boyle, Inventor.

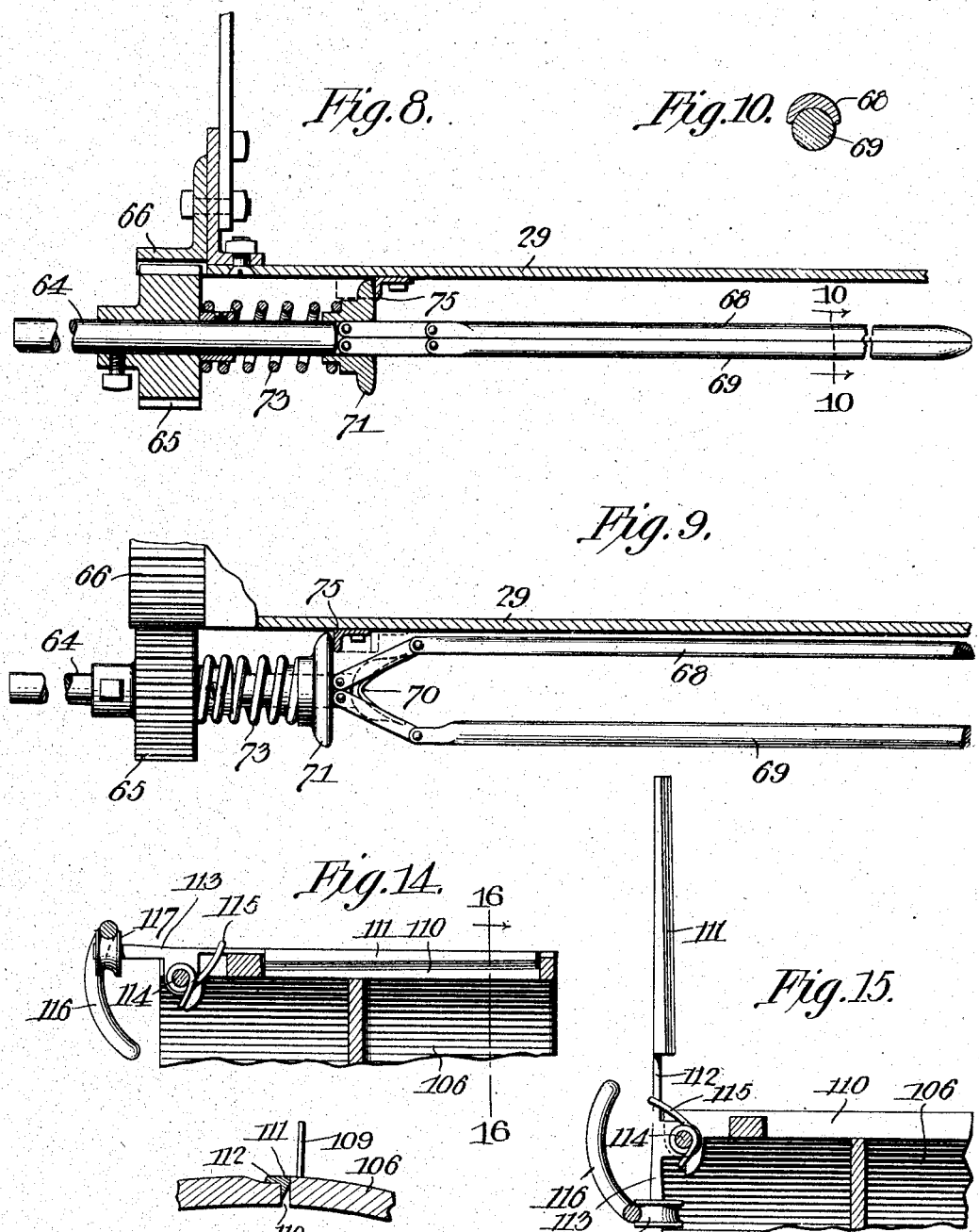

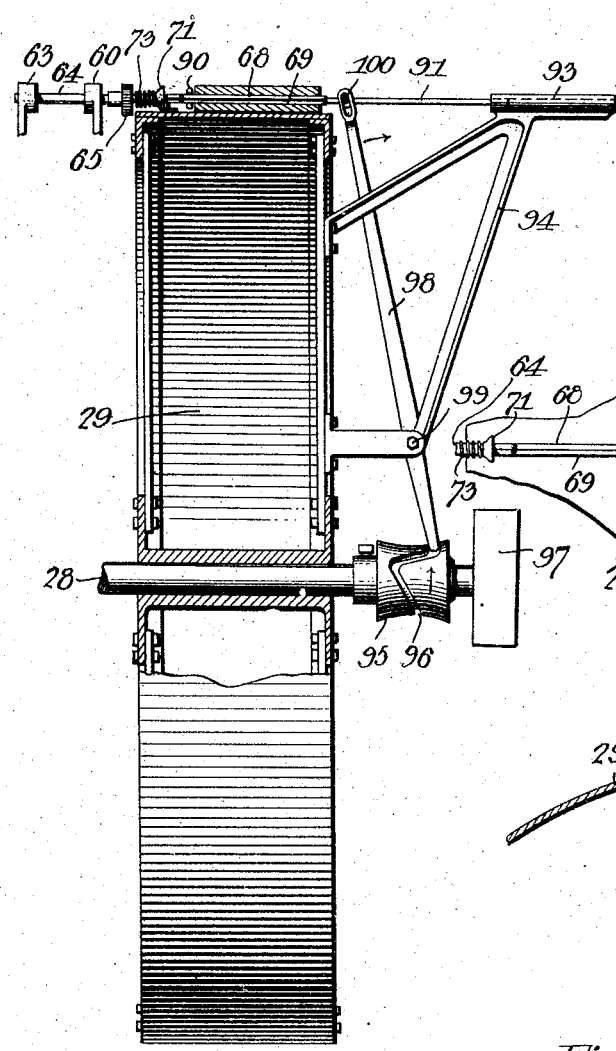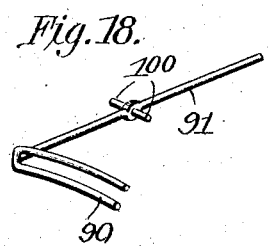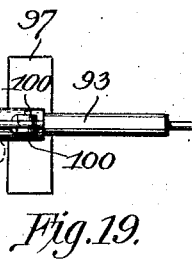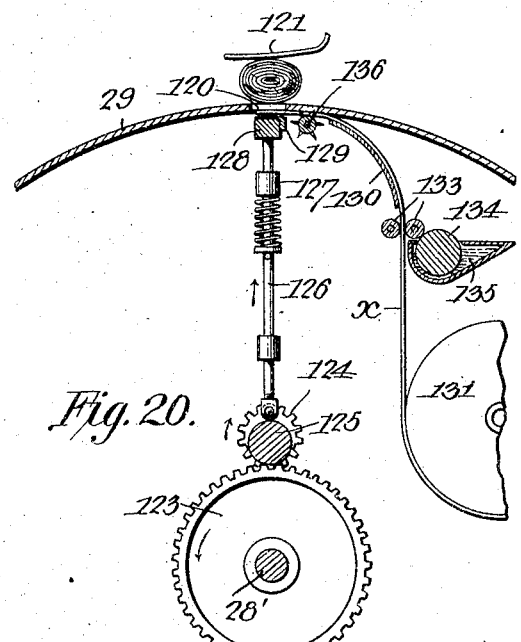

No. 781,123. PATENTED JAN. 31, 1905.
J. L. BOYLE.
NEWSPAPER WRAPPING MACHINE.
APPLICATION FILED AUG. 20, 1903.

10 SHEETS—SHEET 9.

Witnesses
E. K. Stewart,
Jno. E. Parker

J. L. Boyle, Inventor.
by C. A. Snow & Co.
Attorneys

No. 781,123. PATENTED JAN. 31, 1905.
J. L. BOYLE.
NEWSPAPER WRAPPING MACHINE.
APPLICATION FILED AUG. 20, 1903.
10 SHEETS—SHEET 10.
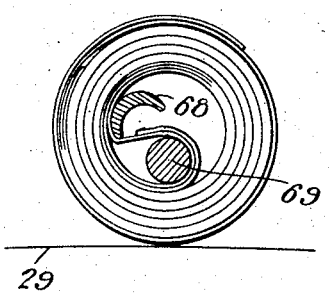
Fig. 24.
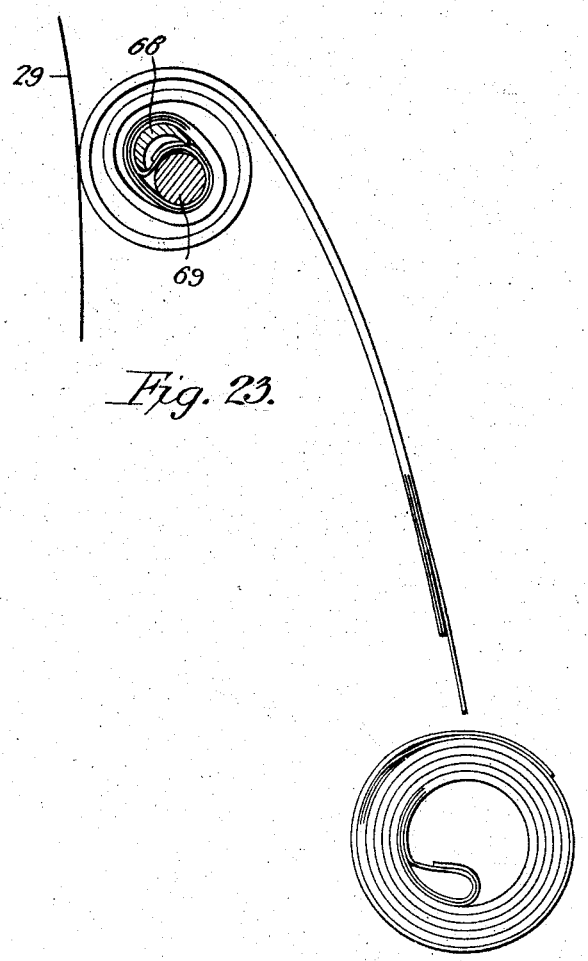
Fig. 23.
Fig. 25.
Witnesses
J. L. Boyle, Inventor.
Attorneys No. 781,123. Patented January 31, 1905.

UNITED STATES PATENT OFFICE.

JOHN LEE BOYLE, OF HARRISBURG, OREGON, ASSIGNOR OF ONE-HALF TO LORENZO H. LASSELL, OF HARRISBURG, OREGON.

NEWSPAPER-WRAPPING MACHINE.

SPECIFICATION forming part of Letters Patent No. 781,123, dated January 31, 1905.

Application filed August 20, 1903. Serial No. 170,217.

*To all whom it may concern:*

Be it known that I, JOHN LEE BOYLE, a citizen of the United States, residing at Harrisburg, in the county of Linn and State of Oregon, have invented a new and useful Newspaper-Wrapping Machine, of which the following is a specification.

This invention relates to certain improvements in machines of that class employed for wrapping newspapers, pamphlets, and other publications, and has for its principal object to provide a machine by means of which newspapers may be folded into small packages and inclosed in wrappers ready for mailing.

A further object of the invention is to provide a paper-clamping device that will form a core on which both the paper and its wrapper are wound.

A further object of the invention is to provide a core member in the form of a paper-clamp on which the paper is wound, and the two are separated longitudinally after the releasing movement of the paper-clamp, pressure on the jaws being relieved in order to permit the discharge of the paper.

A further object of the invention is to provide a wrapping-machine in which the operation of the parts is entirely automatic and in which the wrappers are consecutively severed from the roll of paper, and at the severing-point a suitable supply of adhesive material will be placed at the edge of the wrapper.

With these and other objects in view, as will more fully hereinafter appear, the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 22:
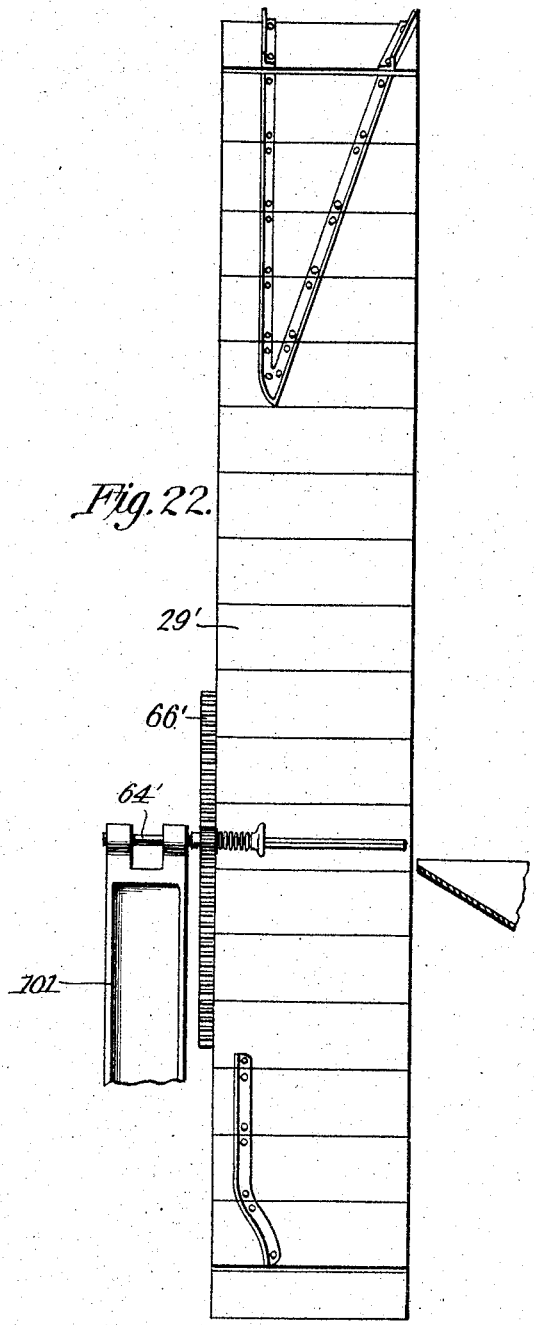

In the accompanying drawings, Figure 1 is a side elevation of a newspaper-wrapping machine constructed in accordance with the invention. Fig. 2 is a plan view of the same. Fig. 3 is a development of the drum or cylinder forming the resisting or retarding surface for the winding of the paper. Fig. 4 is a longitudinal sectional elevation of a portion of the mechanism drawn to an enlarged scale, the section being taken on line 4 4 of Fig. 2. Fig. 5 is a transverse sectional elevation of a portion of the machine, partly on the line 5 5 of Fig. 4. Fig. 6 is an elevation of the machine looking from the side opposite to that from which Fig. 1 is taken. Fig. 7 is a sectional elevation of a portion of the machine on the line 7 7 of Fig. 5. Fig. 8 is a sectional plan view illustrating the paper-clamp and winding-core in closed position. Fig. 9 is a similar view showing the same in open position. Fig. 10 is a transverse sectional elevation of a clamp and core on the line 10 10 of Fig. 8. Fig. 11 is a detail perspective view of a portion of the perforating or severing means by which wrappers are cut from the roll of paper. Fig. 12 is a detail view of one of the wrapper-feeding rollers which also serves to supply mucilage or similar adhesive material to wrappers. Fig. 13 is a sectional plan view of one end of the feed-roller shown in Fig. 12, illustrating the mechanism for operating the mucilage-applying device. Fig. 13$^a$ is a cross-sectional view on the line $aa$ of Fig. 6, illustrating the chute to which the wrapped papers are delivered for the purpose of receiving labels. Fig. 14 is a transverse sectional elevation drawn to an enlarged scale and illustrating the mechanism by which labels are severed and applied to the wrapped papers. Fig. 15 is a view similar to Fig. 14, showing the parts in slightly-different position. Fig. 16 is a transverse sectional elevation of a portion of the mechanism on the line 16 16 of Fig. 14. Fig. 17 is a view, partly in section, illustrating a modification of the mechanism for removing the papers from the clamp and core. Fig. 18 is a detail perspective view of the paper engaging and removing finger. Fig. 19 is a plan view of a portion of the mechanism for removing the wrapped paper. Fig. 20 illustrates a modification of the label-applying mechanism. Fig. 21 is an elevation illustrating a modification of the invention in which the paper clamp and core is relatively stationary and the retarding or friction surface is formed by a movable belt. Fig. 22 is a front elevation of the structure illustrated in Fig. 21. Figs. 23, 24, and 25 are diagrams illustrating different steps in the process of rolling the newspaper and its wrapper.

Similar numerals of reference are employed to indicate corresponding parts throughout the several figures of the drawings.

In the drawings, 1 designates a suitable frame provided at its upper end with a guiding-trough 2, the bottom of which is formed by an endless belt, said belt serving as a support for the newspapers or other publications to be supplied to the wrapping-machine. One of the belt-supports at the discharge end of the trough is in the form of a roll 4, the shaft or spindle of which extends out through one side of the trough and is provided with a small ratchet-wheel 5. With this ratchet-wheel engages a pawl on an arm 6, that is pivoted to the spindle or shaft of the roller and is connected by a suitable link to a pin 7, projecting from a crank-disk 8. The crank-disk is carried by a shaft 9, adapted to suitable bearings in the supporting-frame, and on said shaft is a preliminary feeding-roller 10, against which the horizontal column of papers is forced by the feeding devices. This roller is preferably formed in sections separated by intervening spaces 11 to permit the passage of fingers 12, carried by the belt, and said fingers are arranged at convenient intervals in order that the feed in the direction of the roller 10 may be positive.

Mounted above the shaft 9 is a second shaft 13, carrying a feeding-roller 14, and the two rollers are driven at the same speed but in opposite directions by means of intermeshing gears 15, carried by the shafts 9 and 13.

On revolving the roller 10 the paper with which said roller is held in contact will be elevated, and as the object is to feed the paper between the two rollers 10 and 14 it becomes necessary to employ a positive means for insuring the passage of the paper. To accomplish this, I employ a pair of radial arms 16, disposed one at each end of the roller 14 and mounted loosely on the spindle or shaft 13. These arms have each an extended member 17, and said members are connected by a small roller or rod 18. The hub members of the arms 16 are provided with lugs or fingers 19, that are connected by springs 20 to fixed studs on the frame, said springs serving to return the arms to initial position after each operative movement.

Adjacent to the ends of the roller 14 are two annular trackways or cams 21, carried by the fixed frame of the machine to arrange on lines concentric with the axis of shaft 13. The greater portion of the trackway lies close to the inner line of the frame, and each trackway has a raised portion, as indicated at 22, that extends inward in the direction of the ends of the roller.

Mounted loosely on the shaft are two hubs or gears 23, each carrying a spring-arm 24 in the form of a plate having an inherent tendency to move away from the end of the roller. The outer end of the spring-plate is provided with guide-openings for the reception of pins 25, a pair of pins being carried by each of the spring-plates and each pin having an anti-friction-roller 26 for engagement with the cam-track 21. The pins of each pair are spaced apart for a distance somewhat greater than the width of arm 16, and during the greater portion of the rotative movement of the collars 23 the rollers will be held in contact with that portion of the cam-track adjacent to the inner lines of the frame. When the two spring-plates have passed slightly beyond the vertical line in which the axis of shaft 13 is disposed, the rollers 26 will come into contact with the raised or inward-extended portion of the cam-track and will force the pins 25 inward to engage the arms 16. This locks the arms 16 to the shaft, and said arms receive a rotative movement to an extent sufficient to bring the small bar or roller 18 into contact with the newspaper being raised by roller 10 and force the upper end of the paper between the two feed-rollers. This being accomplished, the rollers 26 again descend to the outer portion of the cam-track and the pins 25 are moved outward to disengage arms 16, after which the arms are restored to initial position by the springs 20.

The mechanism thus far described constitutes a feeding device for the folding and wrapping mechanism, and it may be altered or adjusted in accordance with the size of the article to be wrapped, so that the machine may be employed for the wrapping of ordinary newspapers or special editions, magazines, pamphlets, and paper books of any size.

A portion of the frame is formed by standards 27, that serve as supports for a stationary shaft 28, carrying a stationary circular drum 29 of a width sufficient to accommodate the articles to be wrapped, and the circumference of this drum may be of such size as to permit its employment in connection with a number of independent feeding and wrapper-applying devices, the principal function of the drum being to exert a retarding action on the paper in order to facilitate winding of the same around the combined clamp and core by which the paper is carried.

At a point above the feeding-rollers and at any suitable distance therefrom is mounted a paper-carrying roll 30, having a continuous web of wrapping-paper, from which sheets of proper size are cut preliminary to the wrapping operation.

The frame is provided with bearings for the reception of shafts 34 and 35, that carry drums or rollers 36 and 37, respectively, said rollers being arranged below the paper-roll and both engaging the web of paper to be formed into wrappers. The roller 36 is provided with a radially-disposed slot 38, extending from end to end of the drum and adapted for the reception of a bar 39, having a large number of teeth or needle-points, as indicated at 40 in Fig. 11. When the teeth are projected slightly beyond the periphery of the drum, they perforate and weaken the paper to such an extent as to permit the separation of the wrapper from the web, or the cutting may be made complete by the employment of a suitable knife in lieu of the teeth 40. The bar 39 is connected at its opposite ends to levers 41, mounted on pivot-pins 42 at the ends of the drum, and each lever is connected to a radially-disposed pin 43, adapted to suitable guides at the ends of the drum and normally held projected by springs 44. These springs serve to hold the needles or teeth within the peripheral line of the drum until such time as the headed ends of the pins 43 come into contact with lugs 45, projecting from the ends of the drum 37, this causing inward movement of the pins and a corresponding outward movement of the needles or teeth. The circumference of the drum is equal to the length of a single wrapper, and as the pins are forced outward they perforate the paper, so that it may be readily detached under the strain exerted by the paper wrapping or winding mechanism.

The drum 37 is hollow and contains an adhesive material, such as mucilage, a quantity of which is applied to the edge of the wrappers. In the periphery of the drum 37 is a longitudinally-disposed slot 47, in which extends the periphery of a small roller 48, having one of its journals or spindle ends extending through an opening in the end of the drum and provided with a two-armed tappet member 50, one of said arms being adapted to engage a fixed cam or tappet 51, carried by the frame, and the other arm being held against a stop-pin 52 on the end of the drum, a torsion-spring 53 serving to normally maintain the arm in engagement with such pin. In the periphery of the roller 48 is a slot 54, extending in a line parallel with the axis of the roller and normally held within the interior of the drum in order that it may be supplied with the mucilage or other adhesive material. At the end of each complete revolution of the drum 37 the tappet 50 comes into contact with a fixed cam 51, and the recess or slot 54, filled with adhesive material, is turned around to the dotted-line position indicated in Fig. 12, and the adhesive is applied to the wrapper passing between the two wrapper-feeding drums. After moving beyond the influence of the stationary cam or tappet 51 the torsion-spring 53 serves to again restore the roller 48 to initial position, and the slot or recess 54 is moved inward to receive a fresh supply of adhesive material.

On the stationary shaft 28 is mounted a radially-disposed arm 60, the inner end of which is secured to a belt-wheel 61, receiving motion from any suitable source of power, as from an overhead counter-shaft 62, as shown in Fig. 1. The arm 60 is provided with an extension or bracket 63, and in both the arm and the extension are bearing-openings for the reception of a spindle 64, that is free to rotate and serves as a shank or supporting member for the combined paper-clamp and core. The spindle 64 lies parallel with the stationary shaft 28 and is disposed at a point slightly beyond the periphery of the stationary drum. This spindle is provided with a pinion 65, engaging a rack 66, formed at one edge of the periphery of the drum; but said rack is not continuous, occupying approximately one-eighth of the peripheral line of the drum. At one end of the spindle are two paper-clamping arms 68 and 69, one arm being recessed to permit the introduction of the other and the positive clamping of the paper between them, although this will not in all cases be necessary. The arms are at times held apart by a small spring 70, placed between them at a point near their pivotal connection with the spindle; but during the wrapping movement said arms are held in clamping position by means of a roller 71, that extends beyond the pivoting-point of the arms and is held in engagement therewith by a coiled compression-spring 73. When this spring 73 is free to operate, the roller 71 by engaging the pivoted clamping-arms moves said arms toward each other and firmly grips the paper. During the whole of the wrapping operation the arms are held in clamped position, being then released from the roller 71 and allowed to spread slightly in order to permit the discharge of the wrapped paper.

When in position to receive a newspaper or other articles to be wrapped, the clamping-arms are disposed slightly below the paper and wrapper feeding rollers, and at this time the clamp and actuating-roller 71 is engaged by a fixed cam 75, arranged on the periphery of the stationary drum and serving to keep the roller from engagement with the arms proper and allow the spring 70 to spread said arms in position to receive a paper and its wrapper. As a guiding means and in order to insure proper positioning of the clamping-arms prior to the clamping operation I employ a cam or equalizer 76 in the form of an oblong or ovate block carried by the stationary part of the frame and serving to spread the arms and to hold the same in proper position.

In the operation of the mechanism as thus far described, the parts being in the position shown in Fig. 4, the newspaper to be wrapped is gradually elevated from the trough, and at the proper time the bar or roller 18 comes into contact with the upper portion of the paper and forces the same inward between the two feeding-rollers. At the same time the wrapping-paper is being drawn from the roller 30 and meets the forwarded newspaper at the rear of the two feeding-rollers. The newspaper and the wrapper slide down from an inclined table 77 and are guided between the two clamping-arms, the arms being held in proper position by means of the block 76. As the clamping-arms move up they pass beyond the block 76, and shortly thereafter the roller 71 passes beyond the end of the cam 75. The spring 73 then forces roller 71 inward and moves the arms toward each other, firmly clamping the newspaper and wrapper, and immediately thereafter the pinion 65 engages the segmental rack 66 and the clamp commences to turn in the direction indicated by the arrow in Figs. 23, 24, and 25. During the turning movement of the clamp the paper is wound thereon as a core, and the winding action is assisted by reason of the contact of the paper with the periphery of the drum, and as the winding operation continues the increased diameter of the roll of paper brings the paper more firmly into contact with the drum and increases the solidity of the roll, although the inner portion where the paper is held by the clamping-arms will be comparatively loose. This increased resistance, proportioned to the diameter of the roll of paper, insures the binding of the wrapper at the completion of the rolling operation, and the adhesive surface of the wrapper is firmly pressed against an adjacent portion of the wrapper to complete the operation. The action of the wrapper-detaching and the adhesive-applying drums will be readily understood, these members moving in unison and serving one as a severing means and the other to supply the necessary adhesive material. The wrapping operation will be completed at the time the clamps reach a second cam 80 on the periphery of the stationary drum, and said cam by engagement with the roller 71 will compress the spring 73 and allow the spring 70 to open the clamping-arms and to this extent release the wrapped newspaper. This releasing operation is aided by the fact that the central portion of the paper is wrapped comparatively loose, owing to the fact that during the first portion of the wrapping movement the newspaper and its wrapper are not held very tightly against the periphery of the stationary drum. The periphery of the stationary drum also carries a discharging-cam 81, that engages the inner end of the roll of paper, or that end adjacent to the roller 71, and moves the roll of paper in a direction lengthwise of the clamping-arms, the roll being gradually discharged and falling into a stationary chute 82 at one side of the drum 28.

The wrapped newspapers or other publications passing through the chute 82 are delivered to an addressing-machine mounted on the same shaft with the stationary drum and after being supplied with address-slips are delivered to mail-bags or similar receptacles.

In the removal of the wrapped newspapers from the clamping-arms and core it is obvious that mechanisms of different character may be employed, and in Figs. 17, 18, and 19 is illustrated a modified construction, in which the clamping-arms at the completion of the wrapping operation pass between a pair of forked arms 90, carried by a rod 91, the outer end of which is held by a sleeve 93, carried by a bracket 94 at one side of the stationary drum. On the stationary shaft 28 is mounted a collar 95, having a cam-groove 96, and this collar is secured to a belt-wheel 97 or other actuating member receiving motion from any suitable source of power. The cam actuates the lower end of the lever 98, pivoted on a stud 99, carried by bracket 94, and the upper end of the lever is slotted and bifurcated to engage pins 100 on the rod 91. In the operation of this mechanism the clamping-arms enter the forked arms 90, the arms being disposed between the end of the roll of paper and the adjacent roller 71. The cam-groove 96 then operates on lever 98, and the paper is pulled directly from the clamping-arms, so that by the time the clamping-arms reach the point of bifurcation of arms 90 the arms 90 will be beyond the periphery of the roller and the clamping-arms will be free to continue their rotative movement.

It is obvious that the operation of the mechanism may be reversed if the spindle 64 is held relatively stationary while the drum 29 revolves and brings its rack into engagement with the spindle-carried pinion 65 and the two cams into contact with the roller 71. A further modification on this line is illustrated in Figs. 21 and 22, wherein the spindle 64' is mounted in a fixed portion of the frame, (indicated at 101,) and the drum is replaced by an endless belt 28', formed of a plurality of hinged plates that carry the rack 66' and the cams for actuating the clamping-arms. On the shaft 105, arranged concentric with the stationary shaft 28, is mounted a drum 106, the lower portion of which is partly encircled by the chute 82, and the lower portion of said chute terminates in a pair of discharge-spouts 107, a suitable valve being arranged as indicated at 108 in order to direct the wrapped paper to the mail-bags or other receptacles, and this discharge-spout and its valve permit a continuous operation of the machine in that it permits the removal of a filled bag and the substitution of an empty bag under one spout while the wrapped papers are passing through the second spout into another bag. The periphery of this drum 106 is provided with radially-projecting teeth 109, that pass into the chute 82 and are so arranged that each shall come into contact with one of the wrapped newspapers. Between adjacent sets of pins are slots 110, arranged parallel with the axis of the drum and adapted for the reception of severing-knives 111, each of said knives having a flange 112, that normally lies in the plane of the periphery of the drum. The knives are carried by arms 113, mounted on pivot-pins 114, and around each pivot-pin is passed a torsion-spring 115, engaging one of the arms 113. During a portion of the travel of the arms 113 and knives 110 around the periphery of the drum the arms and knives will be held in the position indicated in Fig. 14, and at the bottom of the drum said arms and knives will be moved to the position shown in Fig. 15 and will be held in that position until they again reach the top of the drum. Secured to the stationary drum is a semicircular cam and bracket 116, adapted to be engaged by rollers 117 on the outer ends of arms 113, and this cam and bracket serve consecutively to move the arms from the position shown in Fig. 14 to that shown in Fig. 15.

The addresses of the subscribers or other persons to whom the wrapped articles are to be mailed are printed on a continuous web, as $x$, Fig. 6, and this web is delivered to the periphery of the drum, so that it shall pass under the open knives, and when the arms 113 have passed beyond the influence of the cam-track 116 the springs 115 will depress said arms and the knives will be brought into engagement with the webs and sever therefrom a single address-label that will be held to the periphery of the drum by the flange 112 of the knife. Shortly after the severing operation the address-labels are brought into contact with adhesive carrying-bars 118, carried by a plurality of arms 119, projecting from a sleeve 120 on a shaft or spindle 121, that may be rotated in any suitable manner. These adhesive carrying-bars are provided with strips of absorbent material and receive a quantity of paste or mucilage to be applied to the successive wrappers with the exception of that portion of the edge of the wrapper held by the flange 112, the absence of adhesive from this small portion of the label being unimportant in so far as the securement of the label is concerned. After reaching the lower portion of the drum and chute the rollers 117 are connected by the cam-track 116 and are moved outward away from the wrapped paper, and the latter, with its label attached, falls to the delivery-spout at the bottom of the chute.

In some cases the address-labels may be applied to wrapped newspapers while the latter are still in engagement with the periphery of the drum 29. To accomplish this, the drum is provided with a slot 120, immediately above which is a stationary spring 121, serving normally to press the wrapped newspaper in the direction of the slot.

On the shaft 28, which in this case would be revoluble, is secured a gear 123, with which meshes a pinion 124 on a transverse shaft carrying a cam or eccentric 125. This cam engages the inner end of a rod 126, having suitable guides 127 in the stationary drum, and at the outer end of said rod is a presser-block 128 and a cutting-knife 129, that coacts with one wall of the slot or opening 120 to form a cutter for the address-slip $x$. The address-slip is guided over a suitable plate 130 from a supply-roller 131 and passes between a pair of rollers 133, one of which is provided with a covering of absorbent material that is supplied with mucilage or other adhesive, a roller 134 partly immersed in adhesive material contained within a vessel 135. The strip is fed intermittently across the top of the presser-block by a toothed roller 136, and the parts are so timed that when a wrapped newspaper arrives opposite the slot or opening 120 the presser-block will be forced upward and will sever an address-slip from the strip $x$ and force the same into engagement with the wrapped newspaper before the latter is discharged from the clamping-fingers.

Having thus described the invention, what is claimed is—

1. In a wrapping-machine, a stationary drum having a stationary cam, the periphery of the drum forming a retarding-surface, and a winding-core movable around its own axis and in an orbital path around said drum, the article carried by the core being moved into contact with the cam to effect its discharge from said core.

2. In a wrapping-machine, a stationary drum the periphery of which forms a retarding-surface, a winding-core having orbital movement around the drum, means for rotating the core on its own axis, and means associated with the drum for engaging the wound article and removing it from the core.

3. In a wrapping-machine, a stationary drum the periphery of which forms a retarding-surface, a clamp movable in an orbital path around the drum, means carried by the drum for controlling opening and closing movement of the clamp, and means associated with the drum for removing the wound articles from said clamp.

4. In a wrapping-machine, a stationary curved retarding-surface, a clamp movable in a plane parallel with the plane of the curved surface, and revoluble about its own axis, and a stationary cam for engaging the wrapped article and moving the same in a longitudinal direction from the clamp.

5. In a wrapping-machine, a paper-clamp comprising a pair of arms, means for clamping said arms on the paper, means for rotating the clamp to effect the winding of an article and its wrapper thereon, a stationary drum forming a retarding-surface, means for traveling the clamp in an orbital path around said drum, and means for separating the wound article and its wrapper from the clamp.

6. In a paper-wrapping machine, a clamp comprising a pair of parallel arms, means for opening and for closing said arms, means for revolving the clamp, a drum maintaining fixed relation with the clamp, the periphery of said drum forming a retarding-surface, means for traveling the clamp in an orbital path around said drum, and means carried by the drum for engaging the paper and its wrapper and removing the same from the clamp.

7. In a paper-wrapping machine, a stationary drum forming a retarding-surface, and having a plurality of fixed cams, a pair of clamps having orbital movement around the drum and movable to clamping and releasing positions by said cams, means for feeding paper to the clamps, means for feeding separate wrappers to said clamps, means for revolving the clamps to effect the winding of the paper, and a cam carried by the stationary drum for engaging the paper and forcing the same in an endwise direction from said clamps.

8. In a paper-wrapping machine, a wrapper-forming means comprising a pair of rollers for engaging a web of paper, a severing-knife carried by one of the rollers, and an adhesive-applying mechanism arranged inside the second roller, said roller having a slot to permit passage of the adhesive from the interior of the roller to the wrapper.

9. In a paper-wrapping machine, a pair of wrapper-forming rollers for engaging a web of paper a severing-knife carried by one roller and normally lying within the peripheral line thereof, and radially-disposed pins having operative connection with the knife and adapted to be engaged by the periphery of the second roller at the completion of each rotative movement of said rollers.

10. In a paper-wrapping machine, wrapper-forming means including a pair of rollers for engaging with a web of paper, a severing-knife carried by one of the rollers and fitting within a radial slot in said roller, a pair of pivotally-mounted levers connected at one end to the knife, pins connected to the opposite ends of said levers, and springs for projecting the outer ends of said pins beyond the periphery of the roller.

11. In a paper-wrapping machine, wrapper-forming means including a pair of rollers for engaging a web of paper, a bar carried by one of said rollers and movable radially thereof, adhesive-carrying devices secured to said bar, pivoted levers connected at one end to the bar, pins connected with the opposite ends of said levers, and springs for projecting the outer ends of said pins beyond the periphery of the roller.

12. In a paper-wrapping machine, a clamping device including spindle, bearings therefor, a pair of pivoted clamping-arms disposed at one end of the spindle, a spring-pressed roller movable longitudinally of the spindle and adapted to pass beyond the pivotal point of the arm thereby to close said arms, and a spring for moving said arms to open position when released.

13. In a paper-wrapping machine, a clamping device including a spindle, spindle-supporting bearings, means for revolving the spindle, a pair of clamping-arms pivoted to one end of the spindle, a roller carried by the spindle, a spring tending normally to move the roller beyond the pivot-point of the arms thereby to close said arms, a secondary spring for opening the arms, a stationary drum having a mutilated rack for engaging the pinion, and cams carried by said drum for engaging the roller.

14. In mechanism of the class described, a wrapping device, a discharge-chute leading therefrom, a revoluble drum, address-applying devices carried by said drum, and feeding and spacing fingers or pins projecting from the drum in said chute.

15. In a mechanism of the class described, a wrapping device, a discharge-chute leading therefrom, a revoluble drum having feeding and spacing members extending into said chute, and address-applying devices carried by said drum.

In testimony that I claim the foregoing as my own I have hereto affixed my signature in the presence of two witnesses.

JOHN LEE BOYLE.

Witnesses:
L. G. LASSELL,
R. B. LASSELL.